United States Patent [19]

Huang et al.

[11] Patent Number: 5,382,859
[45] Date of Patent: Jan. 17, 1995

[54] STATOR AND METHOD OF CONSTRUCTING SAME FOR HIGH POWER DENSITY ELECTRIC MOTORS AND GENERATORS

[75] Inventors: Hao Huang, Aurora; Michael S. DeBruzzi, Golden; Thomas A. Riso, Elizabeth, all of Colo.

[73] Assignee: Unique Mobility, Englewood, Colo.

[21] Appl. No.: 937,311

[22] Filed: Sep. 1, 1992

[51] Int. Cl.$^6$ ............................................. H02K 1/00
[52] U.S. Cl. .................................. 310/216; 310/42; 310/218; 310/254; 310/259
[58] Field of Search ............. 310/254, 44, 259, 58, 310/59, 42, 216, 255, 258, 218; 336/216

[56] References Cited

U.S. PATENT DOCUMENTS

| | | | |
|---|---|---|---|
| 2,078,668 | 4/1937 | Kilgore | 310/258 |
| 2,221,983 | 11/1940 | Mayer et al. | 310/216 |
| 2,501,222 | 3/1950 | Hybler | 310/42 |
| 2,712,084 | 6/1955 | Bridenbaugh | 310/42 |
| 2,761,984 | 9/1954 | Adam et al. | 310/64 |
| 2,774,000 | 12/1956 | Ross | 310/216 |
| 3,652,889 | 2/1972 | Reece et al. | 310/259 |
| 3,824,682 | 7/1974 | Tharman | 310/254 |
| 4,882,514 | 11/1989 | Brynsvold | 310/254 |
| 4,968,911 | 11/1990 | Denk | 310/259 |
| 4,990,809 | 2/1991 | Artus et al. | 310/259 |
| 5,063,011 | 11/1991 | Rutz et al. | 264/126 |
| 5,121,021 | 6/1992 | Ward | 310/44 |
| 5,212,419 | 5/1993 | Fisher et al. | 310/254 |
| 5,239,221 | 8/1993 | Juan | 310/42 |

Primary Examiner—R. Skudy
Attorney, Agent, or Firm—Stevens, Davis, Miller & Mosher

[57] ABSTRACT

A stator core for rotary high power density electromechanical transducers formed of multiple segments which have a plurality of radially oriented teeth. The stator core is a composite of two or more segments circumferentially combined to form a cylindrical stator or armature for electric motors or generators. The segments are wound with wire either when the segments are aligned linearly, when arranged circumferentially on the inside surface of a jig or about a cylinder. The wound stator can have teeth extending radially outwardly or inwardly, to accommodate an outside or inside rotor.

9 Claims, 8 Drawing Sheets

STATOR AND METHOD OF CONSTRUCTING SAME FOR HIGH POWER DENSITY ELECTRIC MOTORS AND GENERATORS

FIELD OF INVENTION

This invention relates to a stator or armature for brushless dc electric motors and generators. The stator or armature is constructed from a plurality of segments that carry the windings and which are assembled in a cylindrical shape. This technology is highly suited for machines with a high pole count which requires a large number of teeth. This motor design will result in a high power density electro-mechanical transducer.

BACKGROUND OF THE INVENTION

The vast majority of conventional electric motors have stator cores constructed from sheets of laminated steel. The individual laminations are punched from flat sheets of steel using specially constructed dies with the necessary shape of slots and teeth incorporated in them. Laminations made by this method are coated with a thin insulation layer, and then a plurality of these laminations are stacked together to form the complete laminated stator. The construction of the stator core with the laminations separated by layers of very thin insulation is intended to control the iron losses experienced in the stator. These losses are a function of the thickness of the lamination and of the material used. This type of insulation technique could be considered to be on the macroscopic level, implying that bulk volumes of material are insulated from each other by an electrically (but not magnetically) insulating layer. Other parameters affecting the iron losses are also important but are outside the scope of this discussion.

A second but less widely used conventional construction typically involves cold pressing raw metal powder into a "green" shape, followed by sintering the product to improve its mechanical properties. It is well known that this technology produces parts with minimal waste of material having good dimensional tolerance (with very little machining required). It is also an effective method of reliably producing parts with complex geometry. Sintering such green shapes, which involves diffusion between particles of controlled size and properties, is typically accomplished at or less than the melting temperature of the material. Sintering increases mechanical strength, magnetic permeability and, unfortunately, iron losses. The increase in iron losses is so significant that some form of macroscopic insulation technique must be employed to control the phenomenon within acceptable limits. The reason for the increase in iron losses during the sintering process is that diffusion, which occurs between the particles, increases their electrical continuity and eddy current losses.

In order to overcome this problem, Reen et al. (U.S. Pat. No. 4,255,494) cold presses powder metal into laminations having a thickness of between 0.008 and 0.150 inch. These "green" structures are then sintered to increase their mechanical strength. Although these parts form complete annular structures, several of these plate-like structures are stacked on too of each other and fastened together to make a stator. The individual particles are not insulated, however electric insulation is provided (on the macroscopic level) by an insulating layer placed between the laminations.

In another approach, Horie et al. (U.S. Pat. No. 4,719,377) describes the production of a complete stator using powder and a resin in a process of cold compaction. In order to avoid the deterioration of the magnetic characteristics, the finished part is not sintered. The parts made by this method do not possess a high tensile strength. To improve the magnetic characteristics, by achieving a higher permeability and a higher saturation flux-density, inorganic powders are mixed in the resin. To decrease the high-frequency losses, a very small quantity of a coupling agent is added to the mixture before compaction.

Eddy current losses in the powdered iron core are caused by variations in the magnetic field. Magnetic field variations are the result of rotation of a rotor (which has permanent magnets mounted on it), and changes in current passing through the motor windings. It is well established that the reaction of iron powder with phosphoric acid results in an iron phosphate coating on the individual particles which decreases the electrical continuity in the iron and reduces the eddy current losses. Subsequent sintering of these particles would destroy the electrical insulating properties of the phosphate coating.

Fisher et al. (U.S. Pat. No. 5,004,944) assigned to the present assignee, uses flux carrying elements comprised of "green" or cold pressed iron powder containing a phosphate coating. Also disclosed is the use of "B" stage epoxy and wax as binders. Although electromagnetic properties have been acceptable, mechanical properties of the material make it unsuitable for some structural applications. The highest value of tensile strength achievable with cold pressing is about 2,000 lb/in$^2$. This value is not high enough to practically enable further processing and handling of the product, and is certainly not high enough to withstand the forces required for high power density motors. This shortcoming in mechanical strength is compensated for by encapsulating or impregnating the armature assembly with glass fiber reinforced epoxy, cast as a binding agent between the windings and the iron powder bars. However, rigidity of the structure is dependent on the elastic modulus of the epoxy. Depending on the stator configuration, the relatively low elastic modulus of epoxy, in certain circumstances, has potential for allowing undesirable deformations and dynamic effects within the stator, caused by oscillatory electromagnetic forces.

It has recently become possible, as explained by Rutz et al (U.S. Pat. No. 5,063,011) to use iron powder coated with a thermoplastic material, in addition to the phosphate layer. This product is referred to as double coated iron. Increased mechanical properties are attained by pressing the powder at a temperature sufficiently high to melt the thermoplastic material, but not high enough to allow large scale diffusion between the phosphate coated iron particles. In addition to the benefit of higher tensile strength, the volume of material which can be pressed is significantly larger when using the thermoplastic coated powder. In contrast to iron cores which are produced with a sintering process, the electrical insulating properties that exist in iron cores produced with particles which are double coated can be considered to be microscopic. In other words, each iron particle is adequately insulated from its adjacent particles. Eddy current losses are controlled on a microscopic level, rather than an a macroscopic level.

Ward et al (U.S. Pat. No. 4,947,065) describes an invention in which a complete stator core is produced in one piece by pressing double coated powdered iron in a large mold. While this procedure makes it possible to avoid punching thin individual laminations and then stacking them, this method has significant drawbacks. The initial cost of the die is significantly higher than a die necessary for punched lamination and can only be justified by the prospect of large volume production. In addition, it is difficult accurately to control the properties of the material contained in a part which has complex geometry and large surface area. Another problem of significant magnitude is the need for a very high tonnage press to compact the powder to the required density. From a mechanical standpoint, these limitations make the single piece stator approach impractical in the case of producing stators for high power density motors.

A single-piece core structure also makes it very difficult to implement the high pole count and narrow slot motor concepts used to reduce motor weight as contemplated in Fisher '944. In Fisher '944 it is demonstrated that fine diameter wire in combination with a large number of poles results in a motor with a high power to weight ratio and a high efficiency. This is achieved by distributing the winding over a larger number of slots compared to conventional motors. A reduction is also seen in the eddy currents induced in the wire which is commonly experienced when using large diameter wire. These features require that the stator or armature be designed with a large number of teeth (and slots). The individual teeth are, therefore, required to be narrow to distribute the coils more evenly around the armature, and to accommodate a high pole count in comparison with conventional designs with concentrated windings and fewer poles. The construction of these narrow teeth or flux carrying members has been successfully demonstrated using iron powder technology, and the parts produced have the necessary magnetic characteristics. The design of such an armature also allows for the implementation of various winding patterns. The rotor disclosed in Fisher '944 is of "double ring" construction. The stator core is positioned between the inner and outer rotating rings. Because of this construction the electromagnetic forces acting radially on the core are balanced. Resulting radial deformations of the core are symmetrical, and therefore tolerable for normal operation of the device. However, there are three disadvantages associated with using a rotor which is of the double ring design as compared to a single ring design: (a) the cost of magnets is double because twice as many magnets are used; (b) mass moment of inertia about the spin axis is significantly greater, resulting in lower motor acceleration; and (c) mechanical noise in these rotors is greater, which could be unacceptable in certain applications.

An alternative design for Fisher '944 is a single ring rotor configuration with a stator core comprised of multiple iron powder segments. Radial electromagnetic forces do not act symmetrically on this core. Due to the difference in rotor configuration and the forces acting on the core, it is possible that the core structure disclosed in Fisher '944 is more appropriate for the double ring design because the relatively low elastic modulus of epoxy at high temperature could allow unacceptable large radial deformations of the core in the single ring design.

SUMMARY OF THE INVENTION

It is an object of this invention to provide a stator core formed of multiple segments formed of pressed double-coated iron powder which have a plurality of radially oriented teeth. Thus, the stator core comprises a composite of two or more axially elongated segments which are circumferentially combined to form a cylindrical stator or armature with windings of parallel fine wire for an improved design for an electric motor or generator.

The method of constructing such stators for electric motors and generators includes forming the segments by press molding double coated iron powder, and then using parallel fine copper windings. Winding is accomplished by a wave winding method.

BRIEF DESCRIPTION OF THE SEVERAL VIEWS OF THE DRAWINGS

FIG. 6 is a schematic representation of wave winding a plurality of linearly aligned segments as shown in FIG. 1 or 4a;

DETAILED DESCRIPTION OF THE INVENTION

Figure 1:
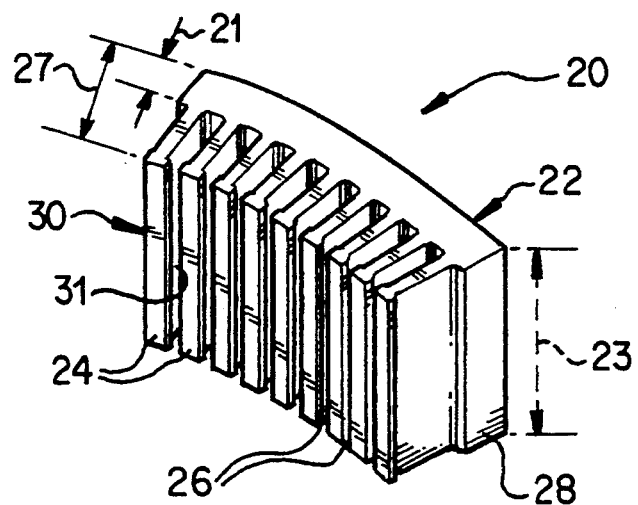
FIG. 1 is a perspective view of a preferred molded segment of the present invention having a plurality of axially elongated radially inwardly extending teeth, alternated with circumferentially spaced slots.

Double coated iron powder used in forming the segments of this invention can be purchased from the Hoeganaes Corporation of New Jersey Methods for producing these particles are disclosed in Rutz (U.S. Pat. No. 5,063,011 the disclosure of which is hereby incorporated by reference). Generally, such powder is produced by treating iron particles, having an average particle diameter of 20-200 microns, with phosphoric acid to form a layer of hydrated iron phosphate on the surfaces of the iron particles. The particles are then heated in the range of about 100° F. up to 2,000° F. for periods of time that are temperature dependent. This curing step provides the particles with a glass-like iron phosphate coating that provides good electrical insulation between the particles. After the phosphating step, the insulated particles are then coated with a thermoplastic material providing a substantially uniform circumferential outer coating to the iron phosphate layer. There are two main reasons for using thermoplastic material. First, the polymer provides additional insulating properties between the particles to further reduce eddy current losses. Second, the material binds the iron particles together and thus increases the ultimate tensile strength of products formed with the powder. Third, under certain circumstances, the polymer can act as a lubricant during die filling and compaction, thereby making the distribution of particles more uniform and complete. If compacted under sufficiently high pressure and at elevated temperature, the density of this compacted material in the final form is at least 92.7% of the theoretical value of iron. The thermoplastic coating may be selected from thermoplastic coatings such as, for example, polyethersulfones and polyetherimides. These doubly-coated particles are compression molded to form a one-piece stator core, as discussed in U.S. Pat. No. 4,947,065 (the disclosure of which is hereby incorporated by reference).

In the present invention, iron powder is treated with phosphoric acid and then coated with a thermoplastic polymer and then pressed into the required segment shapes by passing it through a die of the appropriate shape. The powder is preheated to a temperature between 325° F. and 450° F., and then pressed in the die which is maintained at a temperature between 450° and 600° F. The pressure required to achieve the desired material properties of a segment is about 30 to 50 ton/in$^2$. The finished part may then be heat treated (cured) at 600° F. for one hour. The resulting parts have an ultimate tensile strength of up to 14,500 lb/in$^2$ which is highly appropriate for the intended application. Although machining of these parts is not necessarily desirable, this material strength will allow common machining operations to be performed without destroying the parts. In order to construct a complete stator having an outer diameter of 7.087 inches (180 mm) and an axial length of 2.84 inches (72 mm), the desired electromagnetic properties and the tensile strength described above would require forces of about 760 tons.

Such forces are quite great and a press to generate them is very expensive. This expense can be avoided by assembling a stator from compaction molded segments. Reductions in compression forces can be obtained that are proportional to the number of segments making up a complete stator. The segments can then be used to produce a complete stator or armature for a lightweight high power motor.

The segments of the present invention are shown in each of FIGS. 1, 2, 3, 7, 8 and 11. The segments are curvilinear, and generally formed each with a return path or base and one half or one or more teeth. In a preferred embodiment, for a motor with one hundred and eight teeth in the stator and eighteen poles in the rotor, the optimum number of teeth per segment is nine. This choice of nine teeth per segment satisfies yet another requirement that it is one and a half times the number of teeth covering one pole pitch which is six teeth. This optimum number of teeth has been found to be helpful in avoiding the effects of mechanical noise and vibrations during rotation, and in simplifying winding. The size of each segment and the number of teeth the segment contains are based on manufacturing and winding considerations as well as cost. An additional advantage of this nine tooth segment will be explained infra regarding winding the teeth prior to formation of a circular structure.

A nine tooth segment 20 is shown in FIG. 1. Segment 20 has a return path 22 having a radial depth 21, an axial length 23, and a circumferential width 25 as more clearly shown in FIG. 2. Circumferentially spaced teeth 24 are formed on the inner radial end or inside circumferential surface of return path 22. The teeth point radially inwardly and the teeth define circumferentially spaced slots 26. Segment 20 possesses two axially extending radial side surfaces 28 (only one of which is completely shown in the perspective). The overall radial depth 27 of the segment, which is about 0.8 inches (20.3 mm), is a sum of the radial depth 21 of the return path 22 and the radial depth of a tooth. The radial depth 21 of the return path is about 0.35 inches (8.9 mm) and the radial depth of a tooth is about 0.45 inches (11.4 mm). The axial length 23 of a press molded segment is about 0.947 inches (24 mm). The tips 30 of teeth 24 are circumferentially wider than the remaining body 31 of the teeth. The wider tip results in lower flux densities in that part of the tooth. In designing a stator with half of the above number of teeth, it is even more desirable to make the tooth tip 30 wider than the tooth body 31 itself, resulting in semi-closed slots 26, as shown and described.

Figure 8:
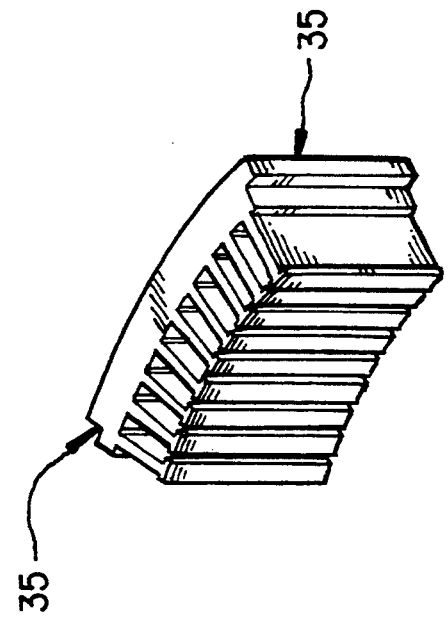
FIG. 8 is a perspective view, similar to FIG. 7, showing different mating structures on the axially extending radial side surfaces of the segments of FIG. 1.
Figure 7:
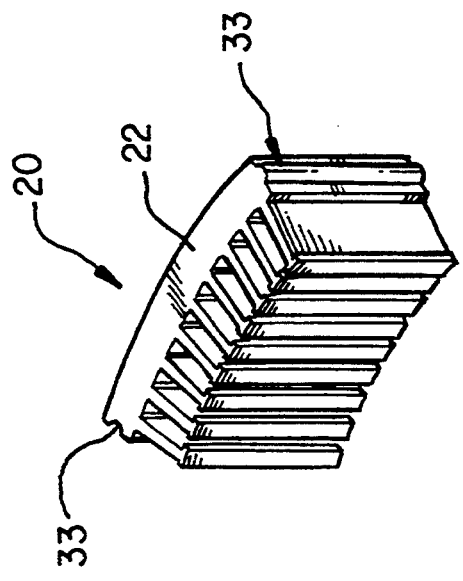
FIG. 7 is perspective view of the segment of FIG. 1, having mating structures on the axially extending radial side surfaces of the segments.

By arranging twelve of segments 20 in a circular configuration, each axially extending radial side surface 28 lies on a radial line extending from the center of the circular configuration, and the tips of the teeth are all pointed radially inwardly. In this manner a complete stator is formed the outer diameter of which is approximately 8.29 inches (210 mm). Axially extending radial side surfaces 28 of the return path 22 of each segment may be pressed molded or machined to have tongue and groove mating surfaces 33 as shown in FIG. 7 or half-lap mating surfaces 35 as shown in FIG. 8.

Figure 2:
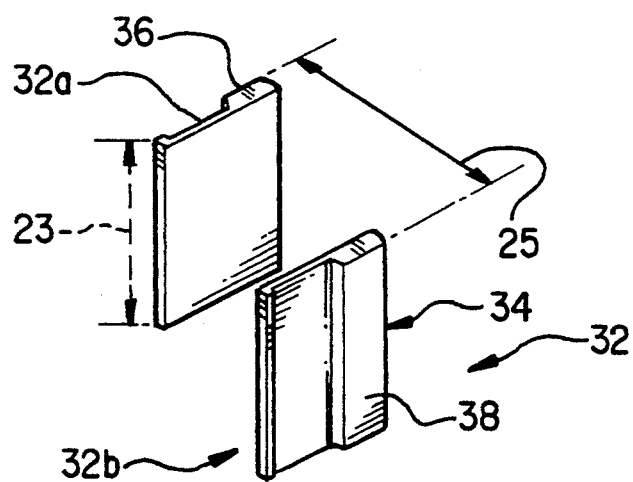
FIG. 2 is a perspective view of two molded segments circumferentially arranged to form a single tooth.

Although it has been determined that the nine tooth segment is optimal, other configurations are possible. The largest number of segments in a stator is equal to twice the total number of teeth in an arrangement where each segment is a half tooth. Two half tooth segments 32a and 32b combined to form a single tooth segment 32 shown in FIG. 2 where each segment is a circumferential path of a single tooth. Segments 32 possess a simple, curvilinear return path 34, two axial ends 36 (only one of which is shown in FIG. 2) and two axially extending radial side surfaces 38 (only one of which is shown in FIG. 2). The dimensions, such as the axial length 23 of half tooth segments 32 and the overall radial depth 27 of a half tooth segment may be the same as the dimensions for segment 20. Two hundred and sixteen of the half tooth segments 32 can be arranged circumferentially (creating spaced slots between the teeth) to form a complete annular stator. The dimensions of such a stator can be the same as the dimensions of the stator produced with segments 20.

Figure 3:
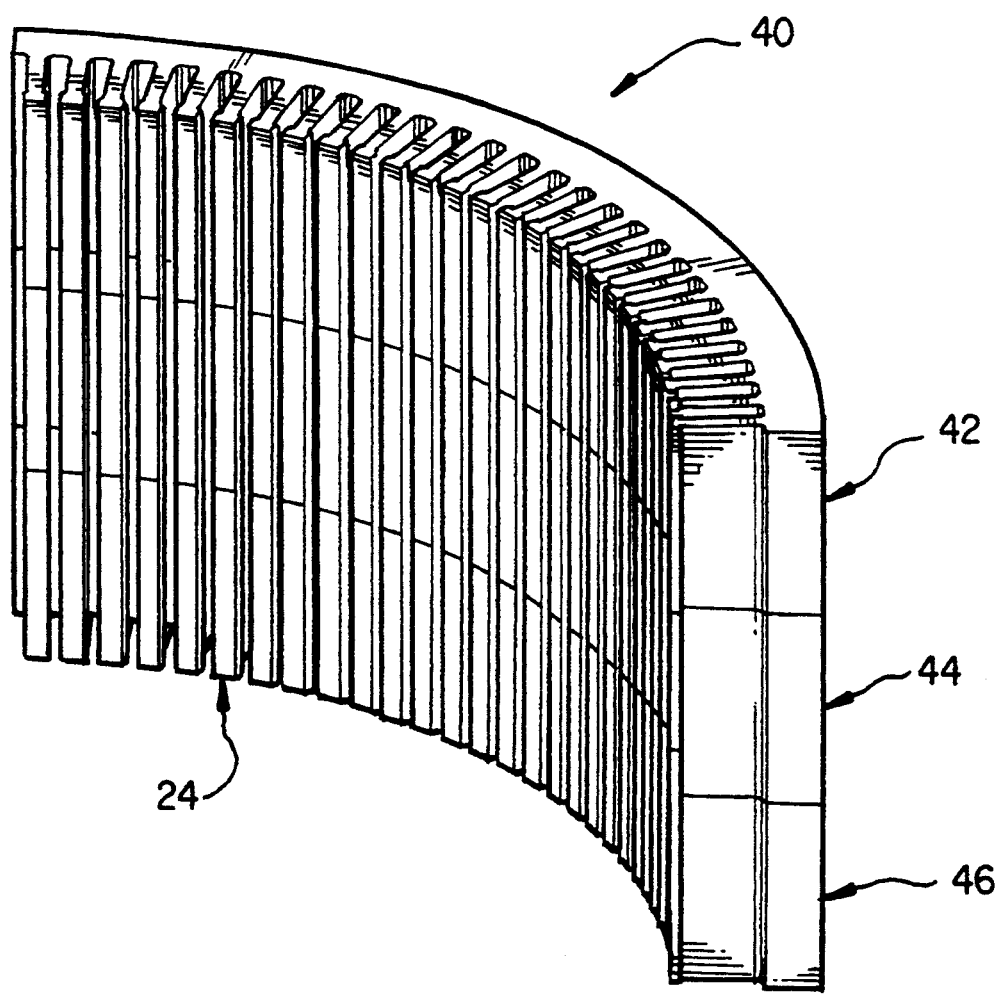
FIG. 3 is a perspective view of a third press molded segment of the present invention.

Due to limited die life and the cost of a high tonnage press, a stator which contains a large number of segments is not desirable foe economic reasons. As the number of segments increases, dimensional tolerance can also become a critical factor. Nevertheless, in certain circumstances a stator which is made of half tooth segments might be satisfactory. At the other extreme, a stator having one hundred and eight teeth can be composed of two segments each having fifty-four teeth. This is the maximum number of teeth on a segment. With respect to dimensional tolerance and dynamic behavior the fifty-four tooth segment is the most desirable. A large number of stators can be made during the operational life of each die. However, due to its complex geometry, production of the die required to make this segment is relatively expensive. In addition, depending on stator diameter, maintaining uniform material density throughout each segment might be difficult. With respect to construction of the segment and ease of winding, a more reasonable solution is to produce a segment which has twenty-seven teeth (four segments per stator). A twenty-seven tooth segment 40 is shown in FIG. 3. Generally, the axial length of any one of the press molded segments such as segments 20, 32 or 40 is 0.947 inches (24 mm) or one third the axial length of a tripart segment. Because iron losses are controlled on the microscopic level, the axial length of the segments is not constrained by electromagnetic properties. The axial length of a segment is limited only by the precision with which the mold can be made, and the uniformity of material density with which the part can be made. It appears as if these factors currently limit the axial length of the half tooth segments 32 to approximately 2–2.5 inches (about 50.8 to 63.5 mm). If possible, it is desirable to make the length of the segments the same as that of the motor, however it is not necessarily feasible to design one piece segments of such a length that will produce acceptable performance specifications. In that case, a plurality of segments each having an axial length of 0.947 inches (24 mm) can be placed axially end-to-end to increase the axial length of the stator. That is, a completed tripart segment can be produced by creating two additional identical segments each having an axial length of 0.947 inches (24 mm) and laminating the three segments together mechanically or with an adhesive, to create a tripart segment as shown more clearly in FIG. 3, wherein press molded segment 40 is composed of three identical sections 42, 44, and 46, each section having an axial length of 0.947 inches. No additional insulating material is required between such laminated sections. To date, segments having nine teeth produced in a one shot molding process having a final axial length of 1.5 inches (38.1 mm) were destroyed by the force necessary to eject the segments from the mold. The difficulty in ejecting the segment from the mold and the safety of the die itself also determines the maximum axial length of the segment. If the correct combination of die lubricant, temperature and compressive force is found, it is likely that segment lengths in excess of 1.5 inches are attainable.

Figure 4A:
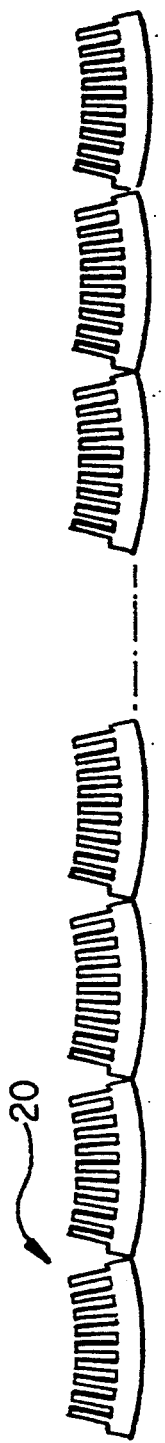
FIG. 4a is a plan view showing a plurality of the segments of FIG. 1 linearly aligned.
Figure 6:
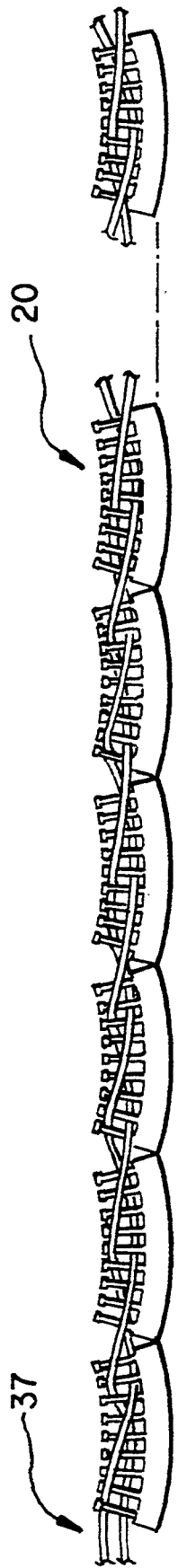

Stators composed of the tripart segments 20, 40 and mono segment 32 of the invention can be wound by a number of methods. In a preferred method, the method made simple by the fact that stators of the invention can be produced in sections, is partially illustrated in FIGS. 4a through 4c and 6. In FIG. 4a segments of FIG. 1 are aligned linearly creating a single row of teeth pointing in the upward direction. The teeth are then wound to create the wave winding shown in FIG. 6. The segmented structures of the invention, with teeth, are structures that permit winding without using a mandrel. Wave winding is more fully shown and described in U.S. Pat No. 5,004,944 the disclosure of which is hereby incorporated by reference and by Fisher et al. in U.S. Ser. No. 502,230 filed Mar. 30, 1990, the disclosure of which is hereby incorporated by reference. Wave winding is characterized by a short end turn compared to the commonly used lap winding. Wave winding leads to a more compact and lower resistance winding. In certain cases, the wave winding requires less time to complete than a lap winding, resulting in savings in production costs. The winding shown in FIG. 6 is the winding for a three phase motor. For multiple turns per slot motors, the wave winding may not be desirable. In that case, the press molded segments can be wound by lap winding. Winding is preferably carried out with thin, insulated wire, such as, for example thirty gauge wire 37. The open structure of the segments lined up linearly facilitates wave winding and the use of parallel, insulated thirty gauge wire produces a flexible structure permitting formation of three segments into the required cylindrical shape. The wound stator results in motors and generators having a high continuous power to weight ratio, generally greater than 1.0 horsepower per pound.

In preparing the segments for the winding process, the inside surfaces of the slots are usually lined with thin insulating paper sold under the trademark NOMEX (not shown) to protect the winding from damage by the stator core composed of the molded iron segments and to provide additional insulation from ground. If the number of teeth in a stator is large or the size of the slots is small, inserting paper insulators can be difficult and time consuming. The alternative is to coat the segments in a fluidized bed with an H-class coating. This is a high temperature coating, withstanding temperatures up to about 130° C. Such a coating is sold by Dexter Electronic Materials Division, located in Industry, California and Olean, N. Y. The product can be purchased by referring to order NO. DK15EG conformal coating powder, an epoxy resin coating powder. This results in a hard protective insulating surface on the segments where the copper wires are wound. The axially extending radial side surfaces 28 at which the segments are joined to each other are kept clean of coating material to allow for the required physical contact between them.

Figure 4B:
FIG. 4b is a plan view showing a plurality of the segments of FIG. 2 linearly aligned.
Figure 4C:
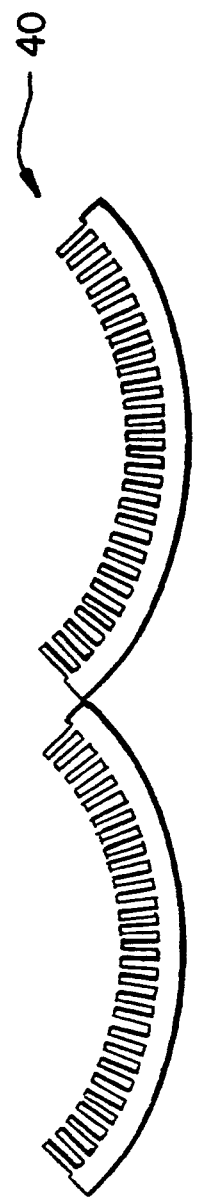
FIG. 4c is a plan view showing a plurality of the segments of FIG. 3 linearly aligned.

As can be seen, with respect to winding simplicity it is advantageous to have a relatively small number of teeth per segment as shown in FIG. 4b to avoid large curvatures in each segment. However, since each individual segment requires some handling, a large number of segments could increase the total manufacturing cost for the finished stator winding. On the other hand, reducing the number of segments (by increasing segment size) also introduces larger amounts of curvature as shown in FIG. 4c when the segments are linearly aligned on a flat surface. The larger amount of curvature can increase the winding difficulty. The segment approach provides for a wide variety of designs and options. Forming the segments into a cylindrical stator is done after the winding is completed.

Figure 5:
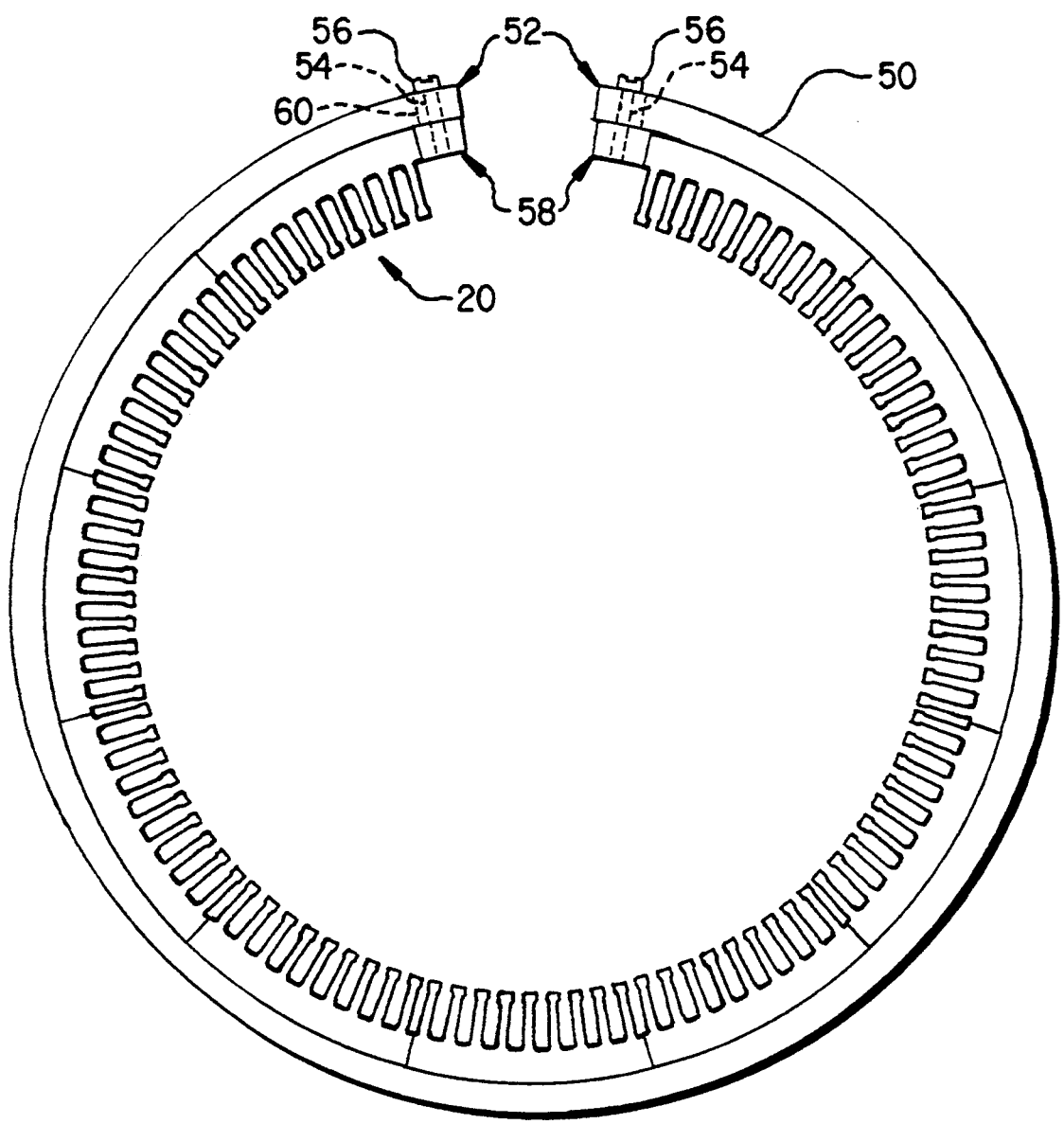
FIG. 5 is a top view of a plurality of the segments of FIG. 1 arranged on a jig prior to receiving winding.

Formation of a stator with winding can also be accomplished by using a partial jig as shown in FIG. 5. In FIG. 5 eleven stator segments 20 are arranged, as shown, on a jig 50. Jig 50 has an axial length equal to or slightly larger than the axial length of the stator. The end sections 52 of jig 50 have bores 54 for receiving threaded fasteners 56 that engage threaded stops members 58. As illustrated by phantom lines 60, bores 54 are sufficiently large to allow adjustment of stop members 58. By this arrangement segments 20 can be circumferentially arranged on the inside circumferential surface of the jig in a tight fitting manner by adjusting the stops 58 and screwing down fasteners 56.

In the assembly shown in FIG. 5, winding the stator is facilitated because the stator segments are circumferentially positioned and the wire bundles can be brought up through the unclosed ends of jig 50. After the assembled eleven segments are wound, stop members 58 are removed from the jig and the last section is positioned to complete the circular stator. Winding is then completed. This arrangement will reduce the probability of a wire becoming pinched between segments, as may happen when forming the circular stator after winding in accordance with the method described relative to FIGS. 4a through 4c and FIG. 6. Thereafter, the winding structure can be varnished.

Figure 9:
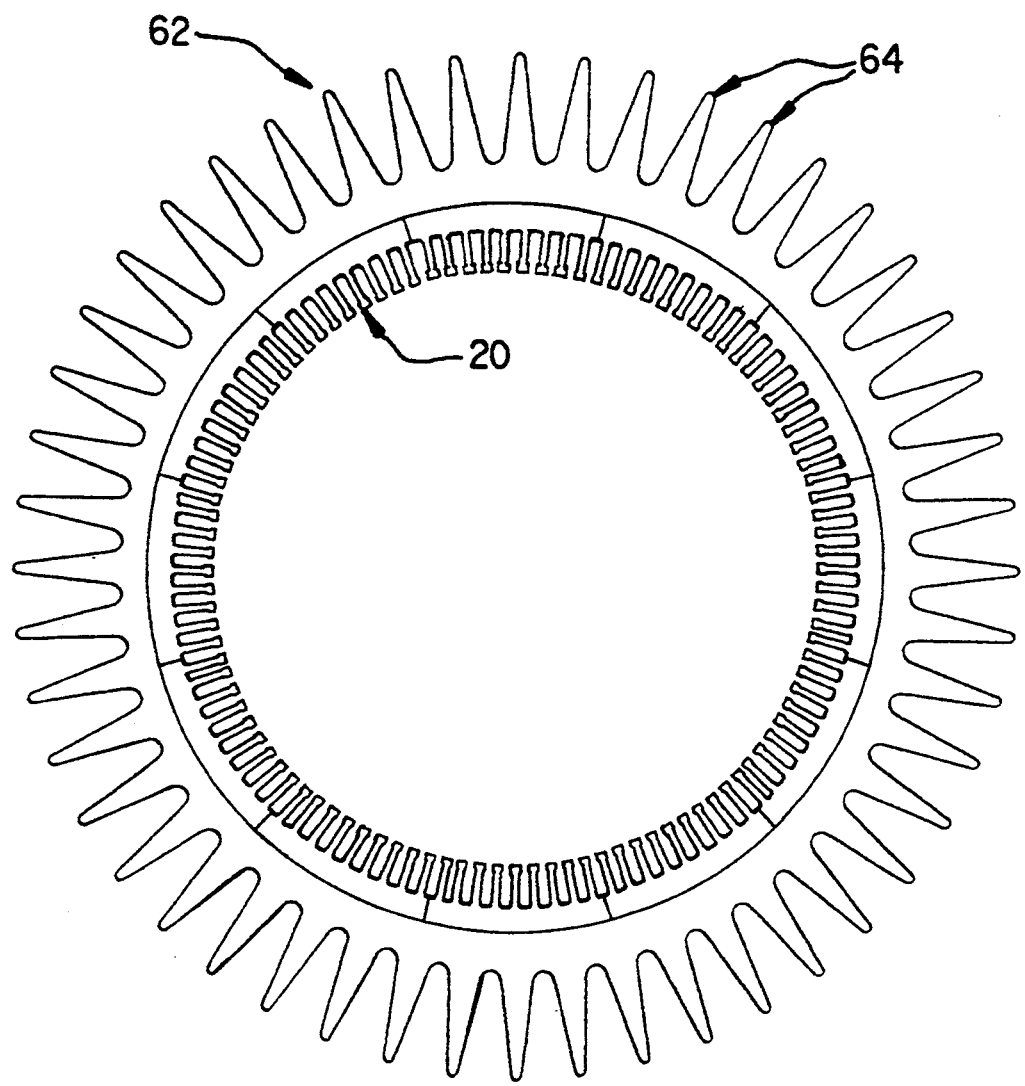
FIG. 9 is a top view of an assembled stator of the invention composed of a plurality of the segments of FIG. 1 maintained in a circumferential arrangement by an annulus having radially outwardly extending fins.

After the winding process is completed, the resulting structure is formed into a cylindrical shape and accurately sized using cylindrical clamps or a metallic ring 62 or rings composed of aluminum or steel, as shown in FIG. 9; the winding has been omitted for clarity. Such a ring 62 or housing has an inner diameter smaller than the outer diameter of a circumferentially assembled stator at ambient temperatures. Differential thermal expansion techniques, corresponding to heating of clamps or ring 62 and/or cooling of the segments, can be employed during assembly of the structure to produce, after return to ambient temperature, an assembly interference fit between ring 62 and the stator formed of the circumferentially arranged segments. For example, the segments may be cooled to reduce their diameter to smaller than the inner diameter of ring 62. The ring is then fitted around the circumferential stator. When the segments warm to ambient temperature an interference fit results. The coefficient of thermal expansion of the molded segments is approximately $8.0 \times 10^{-6}/°F$. and the coefficient of thermal expansion of ring 62, if made of aluminum, is $13.3 \times 10^{-6}/°F$. and if made of steel is $6.0 \times 10^{-6}/°F$.

Figure 10:
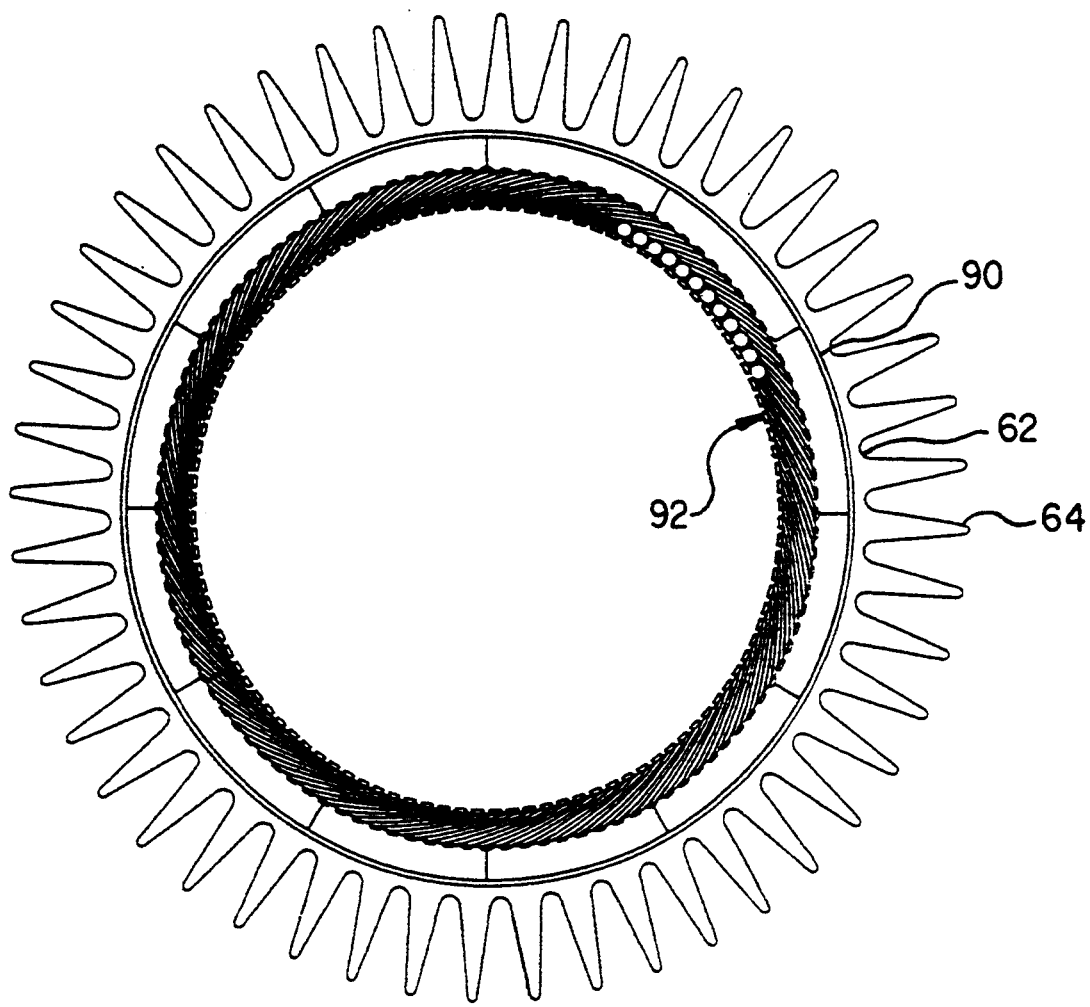
FIG. 10 is a top view of an assembled stator of the invention composed of a plurality of the segments of FIG. 1 maintained in a circumferential arrangement by a containment ring and an annulus having radially outwardly extending fins; as shown the core is wound with wire to form a complete armature structure.

As previously alluded to above, when using the H-class coating material it is undesirable to coat all surfaces of the segments. This requires masking of those surfaces to keep them free of the coating material. It is economical to reduce labor required in masking the segments to a minimum. One method of achieving this objective is to assemble, in an interference fit, the segments comprising the core as described above, in a thin wall tube 90 which acts as a containment ring for the segments, as shown in FIG. 10. The containment ring 90, made of steel or aluminum, should be the same axial length as the core, and the wall should be approximately 0.050" to 0.070" thick. The interference fit of the containment ring and segments will directly prevent deposition of the H-class coating on return path 22 and indirectly prevent deposition of the H-class coating on axial extending radial side surfaces 28, as each side surface is forced to abut an adjacent side surface. A teflon or nylon cylinder which has an outer diameter equal to the inner diameter of the core is then inserted in the inner diametral cavity of the core structure to prevent deposition of the H-class coating on tooth tips 30. The H-class coating is then applied to this assembly, and the cylindrical masking fixture is then removed from the inner diameter of the core. The coated structure is placed in an oven at 300° to 450° F. for 1-2 hours to cure the coating. Excess coating is removed from the outer diameter of the containment ring using a turning process on a lathe.

The winding 92 is then applied to the resulting coated core/containment ring structure, preferably using wave winding techniques. Winding is accomplished similar to the partial jig method described above, except the core structure defines a complete annular structure. The wound core structure is then varnished and assembled in an interference fit with finned ring or housing 62 which is similar to ring 62 shown in FIG. 9 as described above.

The ring 62 or rings used for sizing the stator assembly will become a permanent part of the stator assembly, comprising what could be considered the housing. The primary purpose of this housing is to maintain physical contact between adjacent segments under all operating conditions, in order to prevent excessive deformation of the stator. The housing is made of steel or aluminum as discussed above, and may have multiple, radially outward oriented cooling fins 64 on its outer surface as shown, in FIGS. 9 and 10 to enhance the heat dissipation characteristics of the motor. The complete structure can then be either encapsulated in epoxy by vacuum or pressure casting methods or varnished with a suitable solution in a process similar to that normally used in the manufacturing process of conventional electric motors. As in any manufacturing process of electrical motors, the winding is subjected to testing methods for possible damage to the wire insulation. These methods are commonly known as surge and hi-pot tests.

Figure 11:
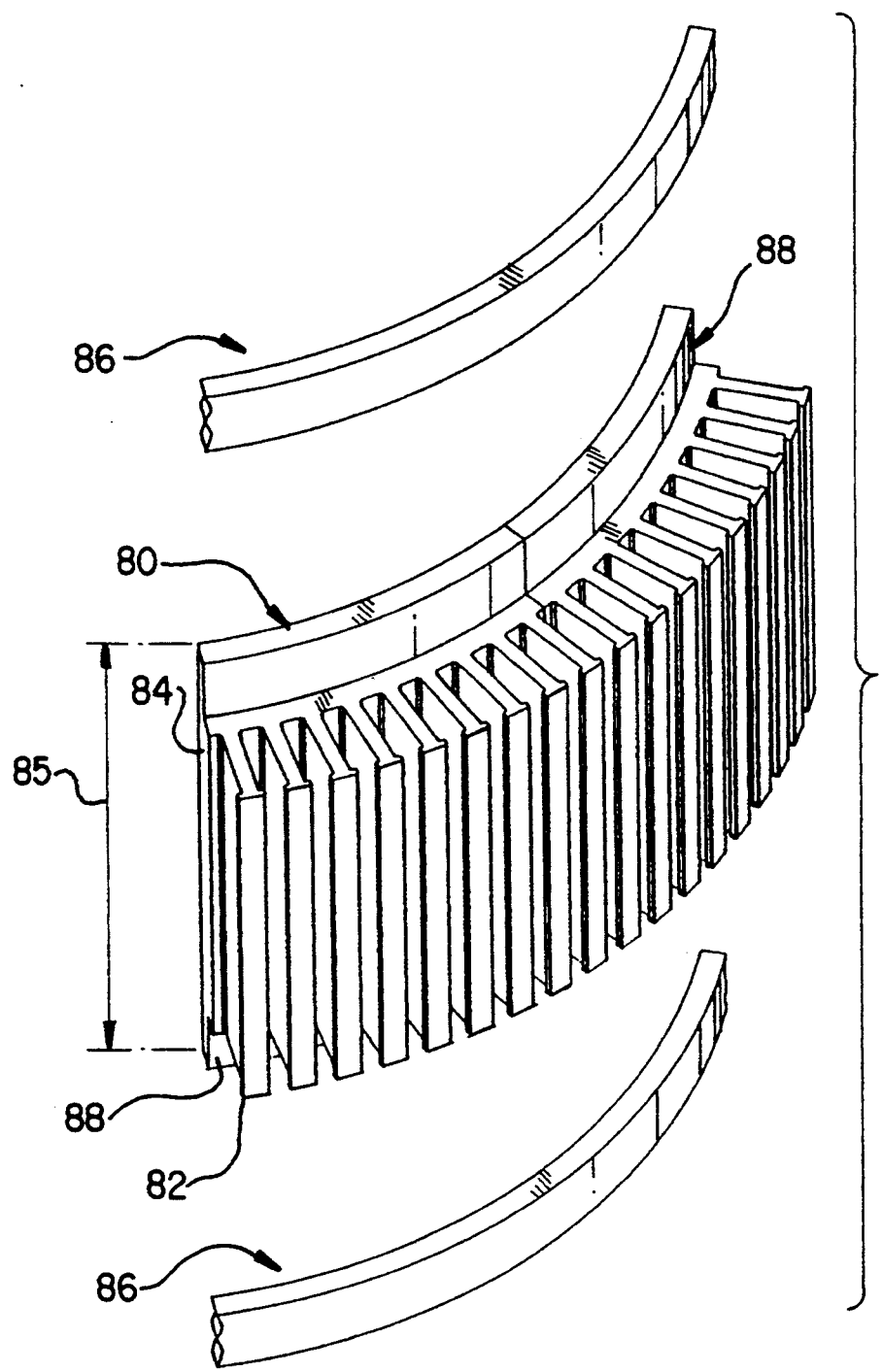
FIG. 11 is a perspective view of a partial annular structure having segments with radially outwardly directed teeth.

Shown and described to this point have been segments wherein the teeth are positioned on the radial inner concave portion of a segment. FIG. 11 shows two press molded segments 80 arranged circumferentially. These segments each have nine teeth, wherein the teeth 82 are formed on the radial outer convex portion of the segment and point in the outwardly extending direction. Such a stator is inherently easier to wind than the stators described above because the teeth point in the radially outward direction.

Segments 80 have a return path 84, the axial length 85 of which is greater than the axial length of a tooth body. The teeth 82 of such segments are substantially centered on the outside convex face of return path 84 which construction defines shoulders 88. It is not currently possible to form this segment without using a machining process. In this case, the segment is pressed with the teeth being the same axial length as the segment. Then the end sections of each segment are ground to form the shoulders. To assemble a complete annular stator core, the concave inside surfaces of the return paths of twelve segments 80 are positioned around the periphery of a cylinder (not shown) so that the axial side surfaces of a segment contact a corresponding surface of adjacent segments and so that the teeth extend in the radial outward direction. The cylinder is made of aluminum or other non-magnetic metal which is a good heat conductor and has a length substantially equal to or greater than the axial length of the return path of the segments. The cylinder acts as a heat sink for heat generated by the segments and windings. In order to ensure that the segments remain in place during winding and when used in an electro-mechanical transducer having a high power to weight ratio annular rings 86, which in cross section are rectangular, are positioned, in an interference fit, around the shoulders 88 of segments 80 circumferentially arranged on the cylinder. Annular rings 86 are made of a non-magnetic material such as stainless steel or aluminum. After fitting the annular rings around the shoulders the annular structure may be wound, with thin insulated wire, to complete the stator.

In a transducer, the stator, with its aluminum cylinder and annular rings 86, would be stationary and a rotor, mounted for rotation, for instance, on the ends of the cylinder rotates about the stator. The heat produced from the working transducer can be removed by circulating a cooling fluid through the cylinder. The cooling fluid would enter and exit the cylinder from fittings communicating with the inside of the cylinder positioned on the structure used to mount the rotor.

While preferred embodiments have been disclosed and described, it will be recognized by those with skill in the art that variations and modifications are within the true spirit and scope of the invention. For instance, a stator may be formed of six segments having nine teeth each and one segment having fifty-four teeth. Any combination of segments is possible. It is noted that the invention is also not limited to stator having one hundred and eight teeth. The appended claims are intended to cover all such variations and modifications.

What is claimed is:

1. An annular stator for a rotary electro-mechanical transducer comprising:
   a plurality of segments, at least some of said segments being identical,
   individual ones of said segments comprising an axially elongated body having a radical outer portion and radial inner teeth portions, said radial outer portion having an axially extending side surface;
   said radial outer portion being circumferentially wider than said radial inner teeth portions so that when said plurality of said segments are assembled in an annular configuration a plurality of slots are defined between said radial inner teeth portions and a return path is defined by direct contact between an axially extending side surface of a first segment and an axially extending side surface of a second segment adjacent to said first segment.

2. The stator of claim 1 comprising at least two segments, each of said segments comprising a plurality of radially inwardly extending teeth portions, a plurality of said teeth portions having a tooth body and a tooth tip and wherein at least some of said tooth tips are circumferentially wider than the body of an associated tooth.

3. The stator of claim 1, wherein said segments are formed of iron powder having a first coating of iron phosphate and a second coating of a thermoplastic resin.

4. The stator of claim 1, wherein a segment is a laminate of a plurality of sections positioned axially end to end.

5. The stator of claim 1 further comprising winding on the radial inner teeth portions.

6. The stator of claim 1 further comprising an annulus concentrically positioned about an outer diameter of the annular configuration formed by said plurality of assembled segments.

7. The stator of claim 6 wherein the annulus has a plurality of outwardly radially extending cooling fins.

8. An annular stator for a rotary electromechanical transducer comprising:
   a plurality of segments, at least some of said segments being identical,
   individual ones of said segments comprising an axially elongated body having a radial inner portion and radial outer teeth portions,
   said radial inner portion having an axially extending side surface;
   said radial inner portion being circumferentially wider than said radial outer teeth portions so that when said plurality of said segments are assembled in an annular configuration a plurality of slots are defined between said radial outer teeth portions and a return path is defined by direct contact between an axially extending side surface of a first segment and an axially extending side surface of a second segment adjacent said first segment.

9. The stator of claim 8, wherein said segments are formed of iron powder having a first coating of iron phosphate and a second coating of a thermoplastic resin.

* * * * *